(12) United States Patent
Chen

(10) Patent No.: US 7,728,281 B2
(45) Date of Patent: Jun. 1, 2010

(54) MOBILE PHONE WITH ROTATING NIGHT VISION

(75) Inventor: Ga-Lane Chen, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 642 days.

(21) Appl. No.: 11/137,209

(22) Filed: May 25, 2005

(65) Prior Publication Data

US 2005/0285019 A1    Dec. 29, 2005

(30) Foreign Application Priority Data

Jun. 18, 2004    (CN) .................... 2004 2 0047385 U

(51) Int. Cl.
*G06M 7/00* (2006.01)
*H01J 5/02* (2006.01)
*H01L 27/00* (2006.01)

(52) U.S. Cl. .................... 250/221; 250/239; 250/208.1

(58) Field of Classification Search ................. 455/566; 250/330–332, 341.8, 239, 221, 208.1; 348/370, 348/371, 14.01, 14.02, 14.04
See application file for complete search history.

(56) References Cited

U.S. PATENT DOCUMENTS

| | | | | |
|---|---|---|---|---|
| 6,259,469 | B1* | 7/2001 | Ejima et al. ............... | 348/14.01 |
| 6,295,088 | B1* | 9/2001 | Tsukahara et al. ....... | 348/333.06 |
| 6,424,843 | B1* | 7/2002 | Reitmaa et al. ............ | 455/566 |
| 6,633,231 | B1* | 10/2003 | Okamoto et al. ........ | 340/539.11 |
| 6,737,648 | B2* | 5/2004 | Fedder et al. ............. | 250/332 |
| 6,995,799 | B2* | 2/2006 | Itoh et al. ............... | 348/333.06 |
| 7,062,291 | B2* | 6/2006 | Ryley et al. .............. | 455/556.1 |
| 7,086,748 | B1* | 8/2006 | Elembaby .................... | 362/88 |
| 7,097,318 | B2* | 8/2006 | Yoshihara .................... | 362/88 |
| 2001/0041586 | A1* | 11/2001 | Irube et al. .................. | 455/556 |
| 2002/0037747 | A1* | 3/2002 | Ueno ......................... | 455/557 |
| 2002/0067608 | A1* | 6/2002 | Kruse et al. ................. | 362/109 |
| 2002/0177467 | A1* | 11/2002 | Hsu ............................ | 455/556 |
| 2003/0036365 | A1* | 2/2003 | Kuroda ......................... | 455/90 |
| 2003/0093805 | A1* | 5/2003 | Gin ............................ | 725/105 |
| 2003/0122957 | A1* | 7/2003 | Emme ......................... | 348/370 |
| 2003/0164881 | A1* | 9/2003 | Ohe et al. ............... | 348/207.99 |
| 2004/0080632 | A1* | 4/2004 | Iwasawa et al. ........... | 348/240.3 |

(Continued)

FOREIGN PATENT DOCUMENTS

| | | | |
|---|---|---|---|
| JP | 2004-320313 | A * | 11/2004 |
| JP | 2005-086395 | A * | 3/2005 |
| WO | WO 03/075146 | A1 * | 9/2003 |

*Primary Examiner*—Thanh X Luu
*Assistant Examiner*—Pascal M Bui-Pho
(74) *Attorney, Agent, or Firm*—Jeffrey T. Knapp

(57) ABSTRACT

A mobile phone with night vision function includes a body (1) and a night vision module (4). The body (1) includes a display (2), a keypad (3), and a storage module (5). The night vision module is disposed at a top end of the body, and includes a lens module (41), an IR (infrared) emitter (42) and an IR detector. The storage module is provided in a sidewall of the body. The night vision module can detect IR radiation and provide information of an IR image. The information of the IR image can be displayed on the display of the body or be saved in the storage module. The mobile phone with night vision function can be used for night vision, illuminating, and photographing at night.

14 Claims, 2 Drawing Sheets

U.S. PATENT DOCUMENTS

| | | | |
|---|---|---|---|
| 2004/0157612 A1* | 8/2004 | Kim, II | 455/445 |
| 2005/0014538 A1* | 1/2005 | Hyun et al. | 455/575.4 |
| 2005/0128747 A1* | 6/2005 | Tsay | 362/253 |
| 2005/0156108 A1* | 7/2005 | Lannestedt et al. | 250/330 |
| 2005/0168566 A1* | 8/2005 | Tada et al. | 348/14.01 |
| 2005/0168965 A1* | 8/2005 | Yoshida | 362/3 |
| 2005/0208978 A1* | 9/2005 | Pylkko | 455/566 |
| 2005/0253927 A1* | 11/2005 | Allik et al. | 348/164 |
| 2006/0014564 A1* | 1/2006 | Kung | 455/557 |
| 2008/0273112 A1* | 11/2008 | Sladen | 348/370 |

* cited by examiner

MOBILE PHONE WITH ROTATING NIGHT VISION

FIELD OF THE INVENTION

The present invention generally relates to a mobile phone, and in particular to a mobile phone with night vision function.

BACKGROUND

With the development of the technologies of wireless communication and information processing, mobile phones are in widespread use nowadays. These mobile phones enable consumers to enjoy the convenience of high-tech services anytime and anywhere. Nowadays mobile phones have all kinds of functions such as storage, keeping a record of events, game functions, WAP (Wireless Application Protocol) functions, sending information, and so on. In particular, many mobile phones integrally provide functions of information recording and photography.

Usually, many users would take mobile phones with themselves due to their convenient portability, and there is more and more demand for higher quality and serviceability of these mobile phones. Some people who engage in night work, for example, border inspectors, military soldiers, policemen, and people going about at night, desire that mobile phones have functions of illuminating, night vision, and night photography. However, the majority of mobile phones lack such functions, and only some mobile phones are able to illuminate by the feeble light from the background light of the display. Further, the effect of illuminating by the background light of the display is frequently not adequate, and consumes much electrical energy.

What is needed, therefore, is a mobile phone which has a night vision function. In particular, a mobile phone which can effectively illuminate or photograph at night is desired.

SUMMARY

In a preferred embodiment, a mobile phone with night vision function includes a body and a night vision module. The body includes a display and a keypad, and a storage module. The night vision module is disposed at a top end of the body, and includes a lens module, an IR (infrared) emitter and an IR detector. The storage module is provided in a sidewall of the body. The night vision module can irradiate a target object with IR radiation, detect IR radiation and provide information of an IR image. The information of the IR image can be displayed on the display of the body or be saved in the storage module.

The mobile phone with night vision function has a night vision module, so it can select and obtain information of an IR images, and display the information of the IR image on the display of the body. The mobile phone is convenient to use for night vision, illuminating, and photographing at night. In addition, the mobile phone with night vision function has a powerful storage module to save information and images obtained by the night vision module.

Other advantages and novel features of preferred embodiments will become more apparent from the following detailed description when taken in conjunction with the accompanying drawings, in which:

DETAILED DESCRIPTION OF THE PREFERRED EMBODIMENTS

Figure 1:
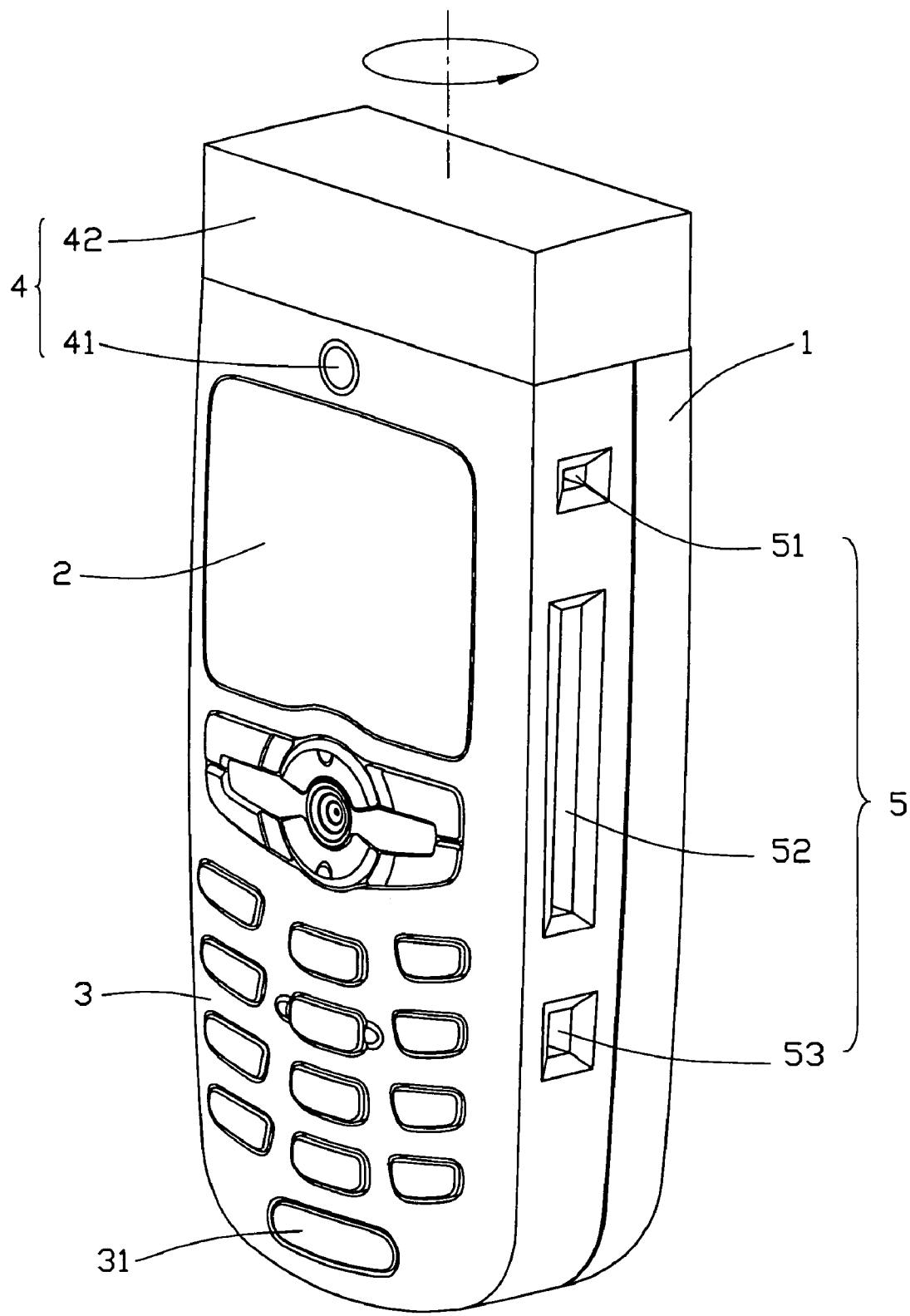
FIG. 1 is an isometric view of a mobile phone with night vision function according to a preferred embodiment of the present invention.

Referring now to the drawings in detail, FIG. 1 shows a portable device like a mobile phone with night vision function. The night vision mobile phone includes a body 1 and a night vision module 4. The body 1 includes a display 2, a keypad 3, a switch key 31, and a storage module 5.

The display 2 is provided in a front, upper portion of the body 1, and the keypad 3 is provided in the body 1 below the display 2. The switch key 31 is for controlling the night vision function. The switch key 31 is elliptical, and is set in the body 1 below the keypad 3. The switch key 31 is connected with an IR emitter circuit (not shown) and an IR detector circuit (not shown), for controlling each of the circuits to be in an "on/off" state so that the night vision module 4 can be on/off accordingly. Usually the switch key 31 is on an "off"state. The switch key 31 is pressed when the night vision function is needed. Subsequently, the switch key 31 is pressed again when the night vision function is no longer needed, so that the switch key 31 returns to the "off"state.

The night vision module 4 is disposed at a top end of the body 1, and includes a lens module 41 as an image acquiring module, an IR emitter 42, an IR detector (not shown), and a processor (not shown). The lens module 41 is mounted in a middle of the upper portion of the body 1, above the display 2. Preferably, the lens module 41 is a zoom lens module. The IR emitter 42 is provided on the top end of the body 1, and is box-shaped. The IR emitter 42 comprises LED (light emitting diode) bundles, and the total number of LEDs is in the range from 100 to 1000. The LED bundles of the IR emitter 42 can be partially used for power saving purposes. The IR emitter 42 can be rotated clockwise or counterclockwise to any desired angle, so that it can transmit IR rays to a desired object located in any of various directions. The IR detector is mounted behind the lens module 41 in the body 1, for capturing information at a temperature sensitivity of +0.1° C. The IR detector detects temperatures in the range from −20° C. to 1,980° C. The wavelength of infrared light is in the range from 0.7 μm to 30 μm. For near-IR, the wavelength range is from 0.7 μm to 1.3 μm. For mid-IR, the wavelength range is from 1.3 μm to 3 μm. For thermal infrared, the wavelength range is from 3 μm to 30 μm. For good IR imaging, the preferred wavelength range detected is from 3 μm to 30 μm. The IR detector can be made from materials such as InSb, InAsB, GaN, GaAs, HgCdTe, or other suitable compound semiconductors. The IR processor is mounted in the body 1, for processing the information on temperature captured by the IR detector and transforming the information into IR image information.

The storage module 5 is provided in the sidewall of the body 1. The storage module 5 is compatible with various kinds of memory storage devices such as a flash memory stick, a micro hard disk, and a DVD (Digital Versatile Disc). The above-mentioned memory storage devices are used to save the image information captured by the night vision module 4, and/or other information of the mobile phone. In order to achieve a recording function, plural storage connectors are provided in the body 1. In the preferred embodiment, the storage connectors are mounted in one sidewall of the body 1. In particular, from top to bottom there is a flash memory stick connector 51, a micro hard disk connector 52, and a DVD connector 53.

Figure 2:
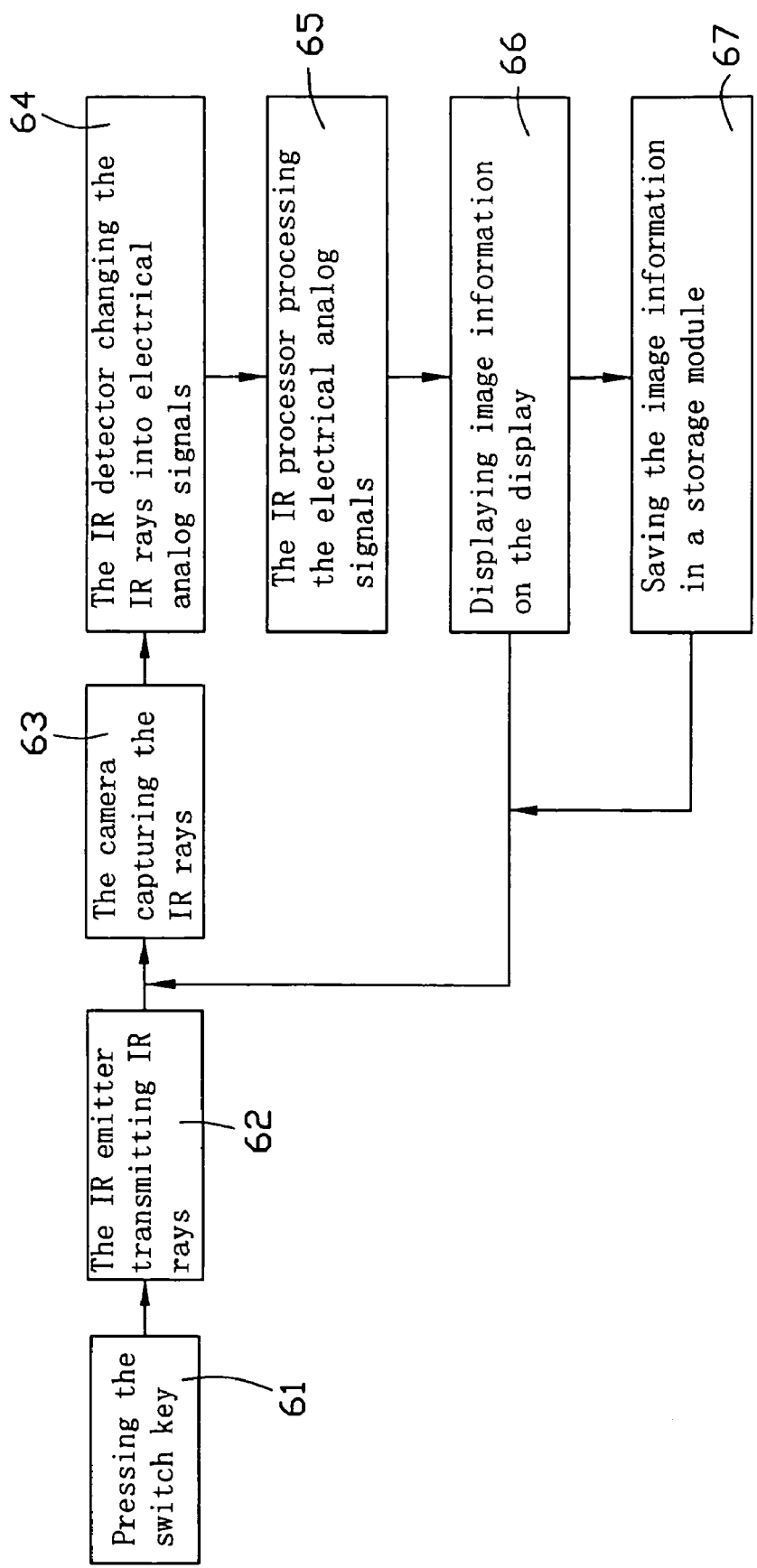
FIG. 2 is a flow chart for using the mobile phone with night vision function of FIG. 1.

Referring to FIG. 2, when using the night vision mobile phone in a dark environment in which visible light is very weak or hardly exists, firstly, in step 61, the switch key 31 is pressed to turn on the IR emitter circuit and the IR detector circuit so that the night vision module 4 can be on accordingly and a night vision function is started. In step 62, the IR emitter 42 can transmit IR rays to a certain object. In step 63, the lens module 41 captures the IR rays coming from the object. The IR detector can change the IR rays into IR information in the form of electrical analog signals in step 64. In step 65, the IR processor turns the electrical analog signals into image information. Then, the image information can be displayed on the display 2 in step 66. If it is necessary to go to step 67, the image information is saved in the storage module 5. If not necessary, steps 63 to 66 are repeated. The above steps are a dynamic, continuing process, so the mobile phone with night vision function can obtain successive images and provide the night vision function.

In an alternative embodiment, the switch key 31 is not limited to being mounted at one end of the keypad 3. The switch key 31 can be in other positions, for example, in a sidewall of the body 1. The switch key 31 can be another shape, such as round. In addition, the camera 41 can be mounted in a sidewall of the body 1 instead of being in the front, upper portion of the body 1. The positions of the memory stick connector 51, the micro hard disk connector 52, and the DVD connector 53 can also be changed according to need.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. A mobile phone with night vision function, comprising:
   a body having a body width and comprising a display and a keypad, the display and the keypad disposed on a same first side of the body;
   a night vision module comprising a lens module, an IR (infrared) emitter, and an IR detector, the lens module being positioned in the first side of the body, the IR emitter being a separate, rotatable box-shaped component from the body and having substantially the same width as the body, positioned above the lens module, the IR detector positioned behind the lens module in the body, the IR emitter being rotatable clockwise or counterclockwise about a long axis of the mobile phone to any desired angle relative to the lens module and the body; and
   a storage module;
   wherein the night vision module can emit IR radiation from an area substantially equal to the width of the body and detect the IR radiation and provide information of an IR image, and the information of the IR image can be displayed on the display and/or saved in the storage module.

2. The mobile phone with night vision function as claimed in claim 1, wherein the storage module is provided in a sidewall of the body.

3. The mobile phone with night vision function as claimed in claim 1, wherein the storage module comprises any one or more connectors selected from the group consisting of a flash memory stick connector, a micro hard disk connector, and a DVD (Digital Versatile Disc) connector.

4. The mobile phone with night vision function as claimed in claim 1, further comprising a switch key provided below the keypad, the switch key configured for controlling the night vision module.

5. The mobile phone with night vision function as claimed in claim 4, further comprising an IR emitter circuit and an IR detector circuit, wherein the switch key is connected with the IR emitter circuit and the IR detector circuit for controlling the IR emitter circuit and the IR detector circuit together such that the night vision module is either in an on state or an off state.

6. The mobile phone with night vision function as claimed in claim 1, wherein the IR emitter comprises one or more light emitting diode bundles, and a total number of light emitting diodes in the one or more light emitting diode bundles is in the range from 100 to 1000.

7. The mobile phone with night vision function as claimed in claim 1, wherein the IR detector is for capturing information at a temperature sensitivity of ±0.1° C.

8. The mobile phone with night vision function as claimed in claim 7, wherein the IR detector detects temperatures in the range from −20° C. to 1,980° C.

9. The mobile phone with night vision function as claimed in claim 1, wherein the IR detector is made from one of InAsB, GaN, and GaAs.

10. The mobile phone with night vision function as claimed in claim 1, wherein the IR emitter emits infrared light with a wavelength larger than 0.7 μm and smaller than 1.5 μm.

11. A portable device comprising:
    a body of said portable device for enclosing said portable device, the body having a body width;
    an image acquiring module disposed in said body and adapted to reach an outside of said body so as to acquire images of objects outside of said body; and
    a night vision module disposed next to said image acquiring module, said night vision module being a separate, rotatable box-shaped component from the body and having substantially the same width as the body, said night vision module being rotatable clockwise or counterclockwise about a long axis of said portable device to any desired angle relative to the body and the image acquiring module according to a location of said objects and capable of providing infrared (IR) light identifiable from an area substantially equal to the width of the body in a visibly dark environment corresponding to said images of objects for said image acquiring module to acquire said images of objects in said visibly dark environment, wherein said body includes a keypad and a switch key provided below said keypad, and said switch key is configured for controlling said night vision module.

12. The portable device as claimed in claim 11, wherein said night vision module comprises a lens module, an infrared (IR) emitter to provide IR light as said identifiable light, and an IR detector for identifying said IR light in said visibly dark environment, and said IR detector is located behind said lens module such that said IR detector can capture said images of objects.

13. The portable device as claimed as claimed in claim 12, wherein said light emitting diodes emit infrared light with a wavelength larger than 0.7 μm and smaller than 1.5 μm, and said IR detector is made from one of InAsB, GaN, and GaAs.

14. The portable device as claimed in claim 11, further comprising a plurality of connectors provided at a wall of said body, said connectors configured for connecting with storage modules, and information of said images of objects being saved in any of a selected one or more of storage modules connected with corresponding one or more of said connectors.

* * * * *